United States Patent [19]
Marling

[11] 3,947,335
[45] Mar. 30, 1976

[54] ISOTOPE SEPARATION BY SELECTIVE PHOTODISSOCIATION OF GLYOXAL

[75] Inventor: John B. Marling, Pleasanton, Calif.

[73] Assignee: The United States of America as represented by the United States Energy Research and Development Administration, Washington, D.C.

[22] Filed: Mar. 4, 1975

[21] Appl. No.: 555,315

[52] U.S. Cl............................................. 204/158 R
[51] Int. Cl.$^2$........................................... B01J 1/10
[58] Field of Search................................ 204/158 R

[56] References Cited
OTHER PUBLICATIONS
Moore, Account of Chemical Research, Vol. 6, 1973, p. 323.

Primary Examiner—Howard S. Williams
Attorney, Agent, or Firm—Dean E. Carlson; F. A. Robertson; Irene S. Croft

[57] ABSTRACT

Dissociation products, mainly formaldehyde and carbon monoxide, enriched in a desired isotope of carbon, oxygen, or hydrogen are obtained by the selective photodissociation of glyoxal wherein glyoxal is subjected to electromagnetic radiation of a predetermined wavelength such that photon absorption excites and induces dissociation of only those molecules of glyoxal containing the desired isotope.

6 Claims, No Drawings

ISOTOPE SEPARATION BY SELECTIVE PHOTODISSOCIATION OF GLYOXAL

BACKGROUND OF THE INVENTION

The invention described herein was made in the course of, or under, ERDA Contract No. W-7405-ENG-48 with the University of California.

This invention relates to a method of separating isotopes of carbon, oxygen, or hydrogen, particularly to such processes which make use of the so-called "isotope shift", i.e., a slight shift in the absorption spectra of isotopes of the same element caused by the small difference in nuclear mass. More particularly, this invention relates to a method of isotope separation wherein selective excitation is followed by chemical dissociation to produce compounds enriched in the desired isotope. The term "dissociation" as used herein refers to the breakup of a molecule with the resultant formation of molecular and/or radical products.

Isotope enrichment by photochemical dissociation is accomplished by tuning the emission of a monochromatic spectral source, such as a laser, to a wavelength such that photon absorption selectively excites and induces dissociation of only those molecules containing the desired isotope. In general, the dissociation products are smaller molecules of greatly enriched isotopic content which are easily separated from the reaction mixture by standard chemical methods.

The ideal molecule for isotopic enrichment by photochemical dissociation should have the following properties: (1) Unit quantum efficiency. One hundred percent of those molecules absorbing light will dissociate: $M + h\nu \rightarrow A + B$, where M, A, B are discrete molecules. (2) Discrete absorption lines. This permits a highly selective single photon dissociation process. (3) Well resolved isotope shift. The molecular absorption coefficient must differ significantly between the various isotopic species. (4) Stable dissociation products. Photo-products A and B (see above) should be stable molecules and not radicals; radicals may attack other molecules M in an isotopically nonselective manner, thereby reducing the isotopic separation factor of the process. (5) Convenient absorption wavelength. The best absorption band would be in the visible range where highly efficient dye lasers are available. (6) Easily achieved high vapor pressure as well as stability in the vapor phase. (7) Ready availability.

An isotope enrichment process by selective photodissociation of formaldehyde is reported by C. Bradley Moore, *Accounts of Chemical Research*, 6 323, 1973. However, the major absorption bands of formaldehyde are in the ultraviolet (3000–3500A) rather than the visible range, thus requiring irradiation by frequency-doubled dye lasers which is less efficient than using tunable light sources emitting directly in the visible range.

It is, therefore, an object of this invention to provide a method of separating isotopes which makes use of "isotope shift".

More particularly, it is an object of this invention to provide a method of separating isotopes of carbon, oxygen, or hydrogen by selective photodissociation, specifically, by selective photodissociation of a molecule whose major absorption bands are in the visible range.

SUMMARY OF THE INVENTION

In accordance with the present invention, there is provided a method of separating isotopes by the selective photodissociation of glyoxal.

More particularly, it has been found that a dissociation product enriched in a desired isotope of carbon, oxygen, or hydrogen is obtained by subjecting glyoxal in the vapor phase to electromagnetic radiation, preferably laser radiation, having a wavelength such that photon absorption excites and induces dissociation of only those molecules of glyoxal containing the desired isotope. The required wavelength is predeterminable from experimental studies of the absorption profiles of the various isotopic species of glyoxal. Preferably, glyoxal is subjected to electromagnetic radiation having a predetermined wavelength in the range of from about 3500 to about 4600A, specifically from about 4300 to about 4600A, to obtain a dissociation product enriched in a desired isotope of carbon, oxygen, or hydrogen. The isotopically enriched dissociation product can be separated from the reaction mixture by standard chemical methods.

DETAILED DESCRIPTION OF THE INVENTION

It has been found that glyoxal fulfills all of the above-cited requirements for an ideal photodissociation molecule.

The photodissociation of glyoxal is represented by the following reactions:

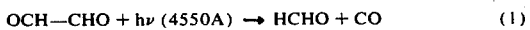

$$\text{OCH—CHO} + h\nu \,(4550A) \rightarrow \text{HCHO} + \text{CO} \qquad (1)$$

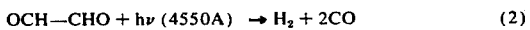

$$\text{OCH—CHO} + h\nu \,(4550A) \rightarrow \text{H}_2 + 2\text{CO} \qquad (2)$$

Reaction (1), which occurs about 60% of the time, has a quantum efficiency of 0.6; the quantum efficiency of reaction (2) is much lower, of the order of about 1%. Thus, the major dissociation mode fulfills the requirement of high quantum efficiency.

Both formaldehyde and carbon monoxide are stable molecules. No radicals are produced in the glyoxal dissociation; hence, there is no problem of isotope mixing by radical reaction.

A significant advantage in using glyoxal as the photodissociation molecule is that a major absorption band is centered in the visible blue (4500A), a spectral region which matches existing highly efficient coumarin dye lasers. Therefore, frequency doubling is not required, and the energy efficiency of the overall enrichment process is correspondingly increased, generally by a factor of about ten.

In addition, glyoxal has a high vapor pressure (284 torr at 26°C) and is stable in the vapor phase. Finally, glyoxal is easily prepared by passing ethylene over selenium dioxide at 150° – 200°C, thereby fulfilling requirement of ready availability.

The selective photodissociation of glyoxal can be used to obtain isotopic enrichment of deuterium, tritium, carbon-13, carbon-14, oxygen-17, and oxygen-18. Any given sample of glyoxal molecules consists mainly of the isotopic species $^{16}O^1H^{12}C^{12}C^1H^{16}O$ since $^1H$, $^{12}C$, and $^{16}O$ are the most abundant isotopes of their respective elements. A much fewer number of glyoxal molecules has a deuterium atom substituted for one of the hydrogen atoms, the isotopic composition being $^{16}O^1H^{12}C^{12}CD^{16}O$, where D represents deuterium ($^2H$). Extending this idea, the glyoxal sample contains numerous isotopic species representing all possible ways that the isotopes of H, C, and O can combine to form OHC—CHO. The fraction of each isotopic species present depends on the natural abundance of the particular isotopes comprising that species. Thus, for example the isotopic species OHC—CTO where T represents tritium ($^3$H) would be present only in trace amounts because tritium is only a trace component of naturally occurring hydrogen. Each of the isotopic species comprising the glyoxal sample is a distinct entity having its own unique absorption spectrum. By choosing a single strong absorption line which does not overlap absorption lines of other species and tuning the emission of a monochromatic spectral source, such as a laser, to precisely that wavelength, one can induce a highly selective photodissociation of the chosen isotopic species.

EXAMPLE

As a specific example of isotopic enrichment according to the present invention, consider monodeuterated glyoxal (OHC—CDO), a compound whose absorption spectrum has been extensively studied. One particular line in the spectrum of OHC—CDO, at 4545A, matches the emission wavelength of an argon laser. Glyoxal, containing a mixture of naturally occurring isotopic species, is allowed to vaporize at room temperature to a total pressure of about 10 Torr in a meter-long, quartz absorption cell. Argon laser light at a wavelength of 4545A is passed through the vapor in the cell. Only the OHC—CDO molecules absorb radiation of that wavelength. The selectively excited OHC—CDO molecules dissociate to produce deuterated formaldehyde. The reaction is represented as follows:

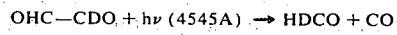
OHC—CDO + hν (4545A) → HDCO + CO

The resulting vaporous mixture is passed through a cold trap at a temperature of about −70°C to about −80°C to freeze out undissociated glyoxal, thereby separating it from the gaseous deuterated formaldehyde. Because of the highly selective nature of the photodissociation, the resulting deuterium enrichment is correspondingly high.

Any source of monochromatic radiation which is capable of being tuned to the narrow bandwidth and exact wavelength requirements can be used in the present process. Lasers are by far the most desirable radiation sources by virtue of their high monochromaticity.

Although the invention has been described with reference to preferred embodiments, various modifications and changes will be apparent to those skilled in the art, all of which may be achieved without departing from the spirit and scope of the invention as defined by the following claims.

What I claim is:

1. A method of separating isotopes which comprises subjecting glyoxal vapor to electromagnetic radiation having a predetermined wavelength such that photon absorption selectively excites molecules of glyoxal containing a desired isotope of carbon, oxygen, or hydrogen and induces dissociation of the selectively excited molecules into a product enriched in the desired isotope, and separating the isotopically enriched dissociation product from the reaction mixture.

2. A method according to claim 1 wherein the electromagnetic radiation is laser radiation.

3. A method according to claim 1 wherein the predetermined wavelength is in the range of from about 3500A to about 4600A.

4. A method according to claim 3 wherein the predetermined wavelength is in the range of from about 4300A to about 4600A.

5. A method according to claim 1 wherein the dissociation product comprise formaldehyde and carbon monoxide.

6. A method according to claim 1 wherein the desired isotope is deuterium and the dissociation product comprises formaldehyde enriched in deuterium.

* * * * *